(12) United States Patent
Yoshida et al.

(10) Patent No.: US 10,224,568 B2
(45) Date of Patent: Mar. 5, 2019

(54) ELECTROLYTIC SOLUTION AND SECONDARY BATTERY

(71) Applicant: NEC Corporation, Tokyo (JP)

(72) Inventors: Noboru Yoshida, Tokyo (JP); Shinsaku Saitho, Tokyo (JP); Kazuaki Matsumoto, Tokyo (JP); Ikiko Shimanuki, Tokyo (JP); Daisuke Kawasaki, Tokyo (JP); Yuukou Katou, Tokyo (JP); Hitoshi Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/021,664

(22) PCT Filed: Jul. 11, 2014

(86) PCT No.: PCT/JP2014/068616
§ 371 (c)(1),
(2) Date: Mar. 11, 2016

(87) PCT Pub. No.: WO2015/037323
PCT Pub. Date: Mar. 19, 2015

(65) Prior Publication Data
US 2016/0226098 A1    Aug. 4, 2016

(30) Foreign Application Priority Data

Sep. 13, 2013 (JP) .................................. 2013-190748

(51) Int. Cl.

| | | |
|---|---|---|
| *H01M 10/0567* | (2010.01) | |
| *H01M 4/62* | (2006.01) | |
| *H01M 10/0568* | (2010.01) | |
| *H01M 10/0569* | (2010.01) | |
| *H01M 10/42* | (2006.01) | |
| *H01M 4/131* | (2010.01) | |
| *H01M 4/133* | (2010.01) | |
| *H01M 4/36* | (2006.01) | |
| *H01M 4/505* | (2010.01) | |
| *H01M 4/525* | (2010.01) | |
| *H01M 4/587* | (2010.01) | |
| *H01M 10/0525* | (2010.01) | |
| *H01M 4/02* | (2006.01) | |

(52) U.S. Cl.
CPC ....... *H01M 10/0567* (2013.01); *H01M 4/131* (2013.01); *H01M 4/133* (2013.01); *H01M 4/364* (2013.01); *H01M 4/505* (2013.01); *H01M 4/525* (2013.01); *H01M 4/587* (2013.01); *H01M 4/62* (2013.01); *H01M 4/622* (2013.01); *H01M 4/625* (2013.01); *H01M 10/0525* (2013.01); *H01M 10/0568* (2013.01); *H01M 10/0569* (2013.01); *H01M 10/4235* (2013.01); *H01M 4/623* (2013.01); *H01M 2004/027* (2013.01); *H01M 2004/028* (2013.01); *H01M 2300/0037* (2013.01); *Y02T 10/7011* (2013.01)

(58) Field of Classification Search
CPC ......... H01M 10/0567; H01M 10/0568; H01M 10/0569; H01M 4/131; H01M 4/133; H01M 4/364; H01M 4/505; H01M 4/525; H01M 4/587; H01M 4/62; H01M 4/622; H01M 4/625
See application file for complete search history.

(56) References Cited

U.S. PATENT DOCUMENTS

| | | | |
|---|---|---|---|
| 7,163,768 B2* | 1/2007 | Utsugi | H01M 10/0567 252/62.2 |
| 2003/0152839 A1 | 8/2003 | Kawai et al. | |
| 2004/0043300 A1 | 3/2004 | Utsugi et al. | |
| 2006/0115728 A1 | 6/2006 | Kawai et al. | |
| 2006/0127778 A1 | 6/2006 | Kawai et al. | |
| 2009/0142663 A1 | 6/2009 | Takeuchi et al. | |
| 2010/0119956 A1* | 5/2010 | Tokuda | H01M 4/134 429/338 |
| 2013/0157124 A1 | 6/2013 | Hagiyama et al. | |
| 2013/0202955 A1* | 8/2013 | Yawata | H01M 10/052 429/188 |
| 2014/0134461 A1* | 5/2014 | Inoue | H01M 2/26 429/7 |
| 2016/0226099 A1* | 8/2016 | Azami | H01M 4/587 |

FOREIGN PATENT DOCUMENTS

| | | |
|---|---|---|
| JP | 2001-155772 | 6/2001 |
| JP | 2003-331915 | 11/2003 |
| JP | 2004-47413 | 2/2004 |
| JP | 2004-281325 | 10/2004 |
| JP | 2004-281368 | 10/2004 |
| JP | 2004-296420 | 10/2004 |
| JP | 2005-222846 | 8/2005 |
| JP | 2005-228631 | 8/2005 |
| JP | 2006-324194 | 11/2006 |
| JP | 2007-53083 | 3/2007 |
| JP | 2008-192488 | 8/2008 |
| JP | 2008-277004 | 11/2008 |
| JP | 2011-54490 | 3/2011 |
| JP | 2012-54200 | 3/2012 |
| JP | 2013-51200 | 3/2013 |
| WO | WO 2012/039251 * | 3/2012 |
| WO | WO 2013/005521 * | 1/2013 |
| WO | WO 2013/024748 A1 | 2/2013 |
| WO | WO 2014/087922 A1 | 6/2014 |

OTHER PUBLICATIONS

Machine translation of JP 2013-051200, published on Mar. 14, 2013.*

(Continued)

*Primary Examiner* — Anca Eoff
(74) *Attorney, Agent, or Firm* — Finnegan, Henderson, Farabow, Garrett & Dunner, L.L.P.

(57) ABSTRACT

It is an object of the present invention to provide an electrolytic solution capable of suppressing gas generation. The present exemplary embodiment is an electrolytic solution comprising a supporting salt, a nonaqueous solvent that dissolves the supporting salt, a cyclic sulfonic acid ester compound represented by predetermined formula (1), and an acid anhydride. According to the exemplary embodiment, an electrolytic solution capable of suppressing gas generation can be provided.

7 Claims, 1 Drawing Sheet

(56) References Cited

OTHER PUBLICATIONS

International Search Report and Written Opinion dated Aug. 12, 2014 in corresponding PCT International Application.

* cited by examiner

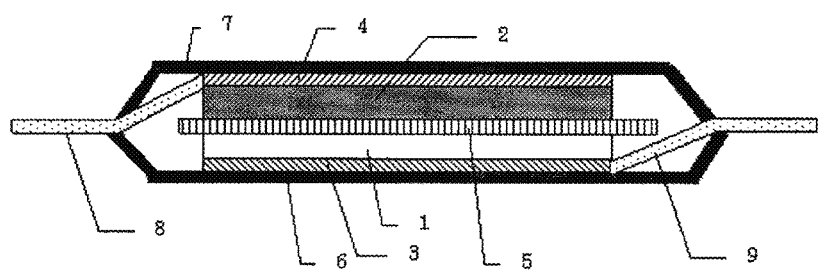

ELECTROLYTIC SOLUTION AND SECONDARY BATTERY

CROSS-REFERENCE TO RELATED PATENT APPLICATIONS

This application is a National Stage Entry of International Application No. PCT/JP2014/068616, filed Jul. 11, 2014, which claims priority from Japanese Patent Application No. 2013-190748, filed Sep. 13, 2013. The entire contents of the above-referenced applications are expressly incorporated herein by reference.

TECHNICAL FIELD

The present invention relates to an electrolytic solution and a secondary battery including the electrolytic solution.

BACKGROUND ART

With the rapid expansion of markets for mobile type tablet terminals, smartphones, electric vehicles, stationary electricity storage systems, and the like, secondary batteries having excellent performance are required.

One example of a method for improving the performance of a secondary battery includes a method of suppressing the decomposition reaction of an electrolytic solution by forming a protective film on an electrode surface. For example, a method of forming a film on an electrode surface by containing an additive in an electrolytic solution is proposed.

Patent Literatures 1, Patent Literature 2, Patent Literature 3, and Patent Literature 4 disclose electrolytic solutions containing aprotic solvents and cyclic sulfonic acid ester compounds having at least two sulfonyl groups.

Patent Literature 5 discloses a lithium ion secondary battery including an electrolytic solution containing a chain disulfonic acid ester compound and a cyclic monosulfonic acid ester compound or a cyclic disulfonic acid ester compound.

Patent Literature 6 describes a secondary battery including an electrolytic solution containing at least one compound selected from a cyclic carbonate compound having an unsaturated bond and an acid anhydride, a sulfur-containing organic compound, and at least one compound selected from a fluorine-containing aromatic compound comprising 9 or less carbon atoms, an aliphatic hydrocarbon compound, and a fluorine-containing aliphatic hydrocarbon compound.

Patent Literature 7 describes a nonaqueous electrolytic solution containing a monofluorophosphate and/or a difluorophosphate and further containing at least one compound selected from the group consisting of a compound represented by a predetermined formula, a nitrile compound, an isocyanate compound, a phosphazene compound, a disulfonic acid ester compound, a sulfide compound, a disulfide compound, an acid anhydride, a lactone compound having a substituent at the α-position, and a compound having a carbon-carbon triple bond.

Patent Literature 8 discloses an electrolytic solution containing at least one compound selected from the group consisting of fluorine-containing ethylene carbonate derivatives, a compound represented by a predetermined formula, and a compound represented by a predetermined formula, and a cyclic disulfonic acid ester represented by a predetermined formula.

Patent Literature 9 discloses a nonaqueous electrolytic solution containing a compound represented by a predetermined formula.

CITATION LIST

Patent Literature

Patent Literature 1: JP2004-281368A
Patent Literature 2: JP2005-222846A
Patent Literature 3: JP2004-281325A
Patent Literature 4: JP2005-228631A
Patent Literature 5: JP2006-324194B
Patent Literature 6: JP2003-331915A
Patent Literature 7: JP2008-277004A
Patent Literature 8: JP2013-051200A
Patent Literature 9: WO 2013/024748

SUMMARY OF INVENTION

Technical Problem

However, even higher performance of secondary batteries is demanded, and the improvement of various battery characteristics is required.

It is an object of the present invention to provide an electrolytic solution capable of suppressing gas generation.

Solution to Problem

One of the present exemplary embodiments is
an electrolytic solution including a supporting salt, a nonaqueous solvent that dissolves the supporting salt, a cyclic sulfonic acid ester compound represented by the following formula (1), and an acid anhydride.

Formula 1

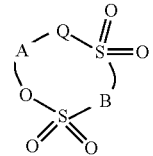

(1)

(In formula (1), Q represents an oxygen atom, a methylene group, or a single bond; A represents an alkylene group having 1 to 6 carbon atoms, a carbonyl group, a sulfinyl group, a sulfonyl group, a fluoroalkylene group having 1 to 6 carbon atoms, or a divalent group having 2 to 6 carbon atoms in which an alkylene group or a fluoroalkylene group is bonded via an ether bond; and B represents an alkylene group having 1 to 6 carbon atoms, a fluoroalkylene group having 1 to 6 carbon atoms, or an oxygen atom.)

One of the present exemplary embodiments is a secondary battery including the above electrolytic solution.

Advantageous Effect of Invention

According to the present exemplary embodiment, an electrolytic solution capable of suppressing gas generation can be provided.

BRIEF DESCRIPTION OF DRAWING

FIG. 1 is a schematic cross-sectional view showing an example of the configuration of a secondary battery in the present exemplary embodiment.

DESCRIPTION OF EMBODIMENTS

Exemplary embodiments will be described below.

[1] Electrolytic Solution

An electrolytic solution in the present exemplary embodiment including a supporting salt, a nonaqueous solvent that dissolves the supporting salt, a cyclic sulfonic acid ester compound represented by formula (1), and an acid anhydride.

When a cyclic sulfonic acid ester compound is added to an electrolytic solution, the capacity retention rate of a secondary battery can be improved, but gas generation accompanying charge and discharge increases, and the volume increase of the battery is large. It has been found that in the present exemplary embodiment, by adding an acid anhydride to the electrolytic solution containing the cyclic sulfonic acid ester compound, gas generation can be suppressed even when the cyclic sulfonic acid ester compound is included therein.

As the mechanism of the synergistic effect of adding the acid anhydride to the electrolytic solution containing the cyclic sulfonic acid ester compound to suppress gas generation, the following reason is considered. As described above, the cyclic sulfonic acid ester compound represented by formula (1) decomposes by an electrochemical oxidation-reduction reaction during a charge-discharge reaction to form a film on a negative electrode surface, thereby being able to suppress the decomposition of the electrolytic solution and the supporting salt, but with the cyclic sulfonic acid ester compound alone, gas generation accompanying charge and discharge increases. Now, when the acid anhydride is further added to the electrolytic solution in addition to the cyclic sulfonic acid ester compound, the acid anhydride is decomposed before the cyclic sulfonic acid ester compound during initial charge, and excessive decomposition of the cyclic sulfonic acid ester compound is suppressed. In addition, the acid anhydride also contributes to the formation of the film in addition to the cyclic sulfonic acid ester compound, and a good film is formed. As a result, it is considered that the electrolytic solution in the present exemplary embodiment can suppress gas generation. The above theory is a presumption and does not limit the present invention.

The components of the present invention will be described below.

<Cyclic Sulfonic Acid Ester Compound>

The cyclic sulfonic acid ester compound in the present exemplary embodiment is represented by the following formula (1):

Formula 2

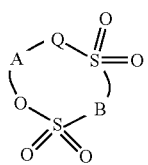

(1)

(In formula (1), Q represents an oxygen atom, a methylene group, or a single bond; A represents an alkylene group having 1 to 6 carbon atoms, a carbonyl group, a sulfinyl group, a sulfonyl group, a fluoroalkylene group having 1 to 6 carbon atoms, or a divalent group having 2 to 6 carbon atoms in which an alkylene group or a fluoroalkylene group is bonded via an ether bond; and B represents an alkylene group having 1 to 6 carbon atoms, a fluoroalkylene group having 1 to 6 carbon atoms, or an oxygen atom.)

In formula (1), the alkylene group and the fluoroalkylene group can be linear or branched.

In Q in formula (1), the number of carbon atoms of the alkylene group is preferably 1, 2, 3, 4, or 5. The number of carbon atoms of the fluoroalkylene group is preferably 1, 2, 3, 4, or 5.

In B in formula (1), the number of carbon atoms of the alkylene group is preferably 1, 2, 3, 4, or 5. The number of carbon atoms of the fluoroalkylene group is preferably 1, 2, 3, 4, or 5.

As the cyclic sulfonic acid ester compound represented by formula (1), for example, cyclic disulfonic acid ester compounds represented by the following formulas (2) to (7) can be used.

Formula 3

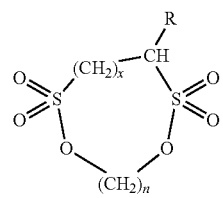

(2)

(In formula (2), x is 0 or 1; n is 1, 2, 3, 4, or 5; and R represents a hydrogen atom, a methyl group, an ethyl group, or a halogen atom (for example, a fluorine atom). When x is 0, the adjacent sulfur atom and carbon atom are bonded by a single bond.)

Formula 4

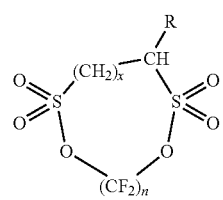

(3)

(In formula (3), x is 0 or 1; n is 1, 2, 3, 4, or 5; and R represents a hydrogen atom, a methyl group, an ethyl group, or a halogen atom (for example, a fluorine atom). When x is 0, the adjacent sulfur atom and carbon atom are bonded by a single bond.)

Formula 5

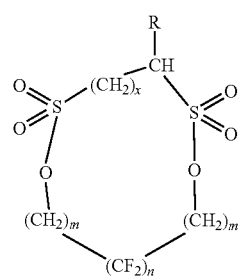

(4)

(In formula (4), x is 0 or 1; m is 1 or 2; n is 1, 2, 3, or 4; and R represents a hydrogen atom, a methyl group, an ethyl group, or a halogen atom (for example, a fluorine atom). When x is 0, the adjacent sulfur atom and carbon atom are bonded by a single bond.)

Formula 6

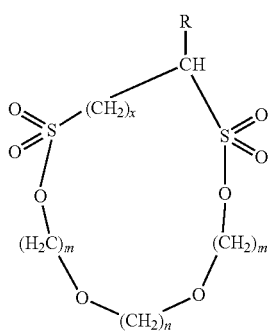
(5)

(In formula (5), x is 0 or 1; m is 1 or 2; n is 1, 2, 3, or 4; and R represents a hydrogen atom, a methyl group, an ethyl group, or a halogen atom (for example, a fluorine atom). When x is 0, the adjacent sulfur atom and carbon atom are bonded by a single bond.)

Formula 7

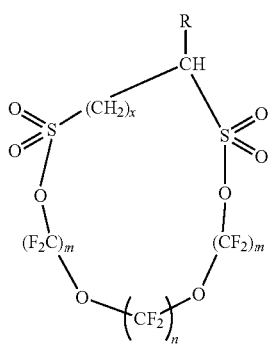
(6)

(In formula (6), x is 0 or 1; m is 1 or 2; n is 1, 2, 3, or 4; and R represents a hydrogen atom, a methyl group, an ethyl group, or a halogen atom (for example, a fluorine atom). When x is 0, the adjacent sulfur atom and carbon atom are bonded by a single bond.)

Formula 8

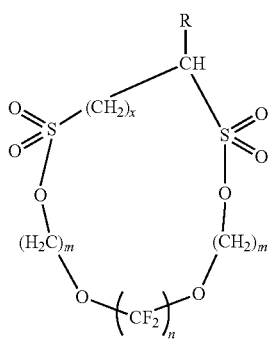
(7)

(In formula (7), x is 0 or 1; m is 1 or 2; n is 1, 2, 3, or 4; and R represents a hydrogen atom, a methyl group, an ethyl group, or a halogen atom (for example, a fluorine atom). When x is 0, the adjacent sulfur atom and carbon atom are bonded by a single bond.)

In addition, examples of the cyclic sulfonic acid ester compound represented by formula (1) are specifically shown in Tables 1 and 2, but the present invention is not limited to those.

TABLE 1

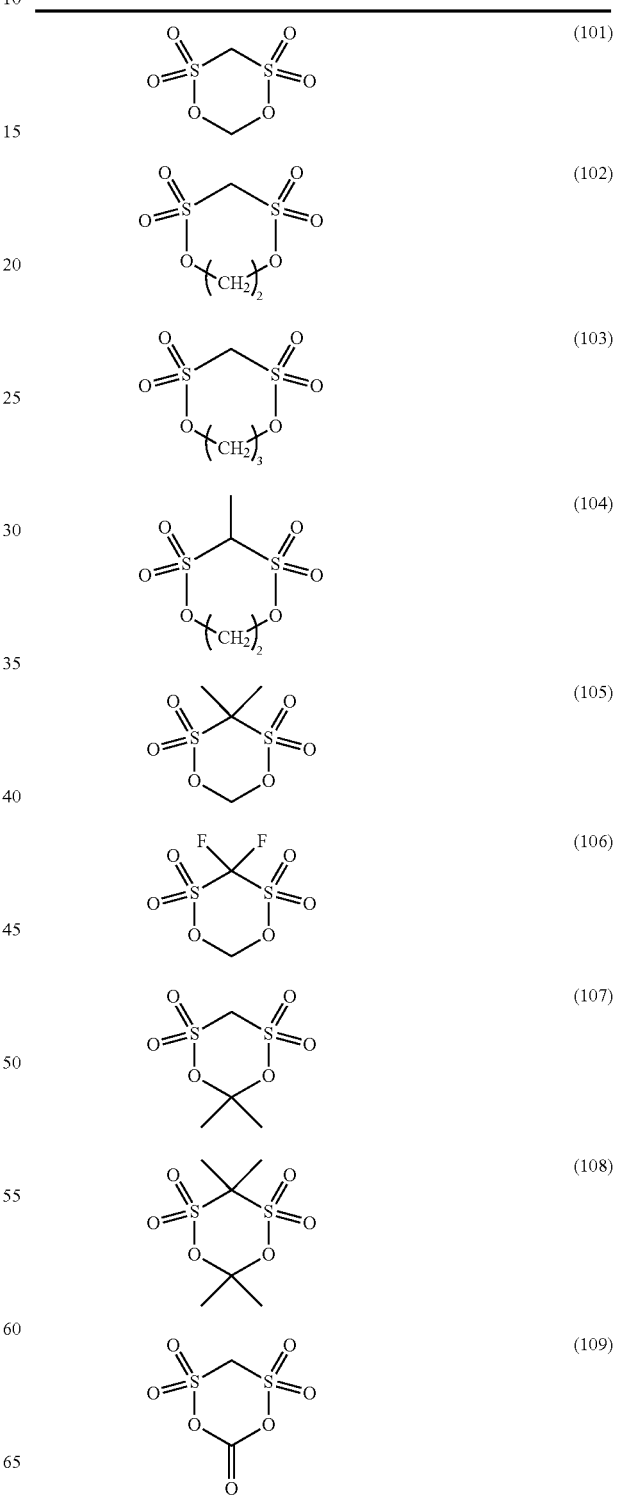

TABLE 1-continued

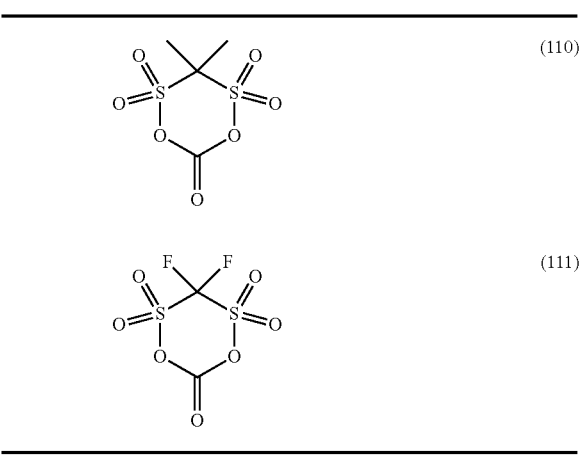

TABLE 2

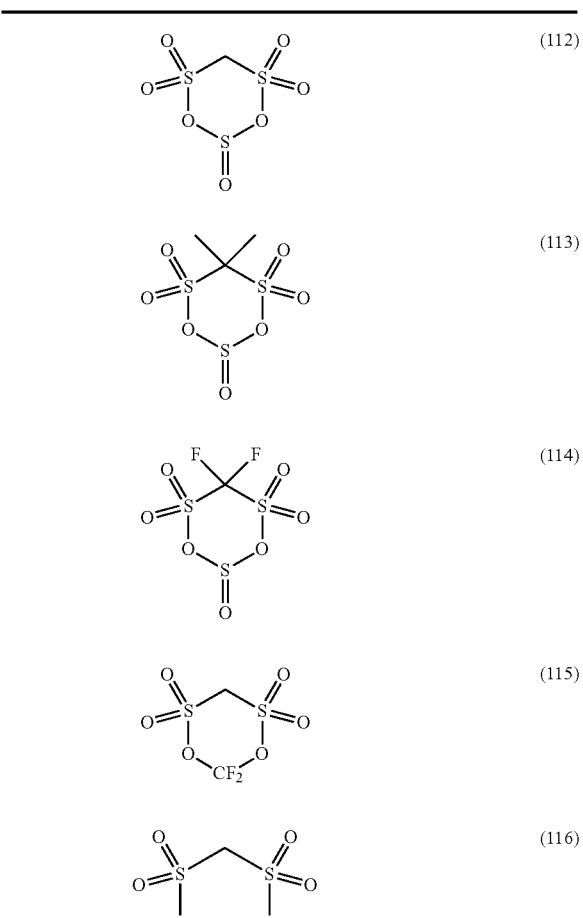

TABLE 2-continued

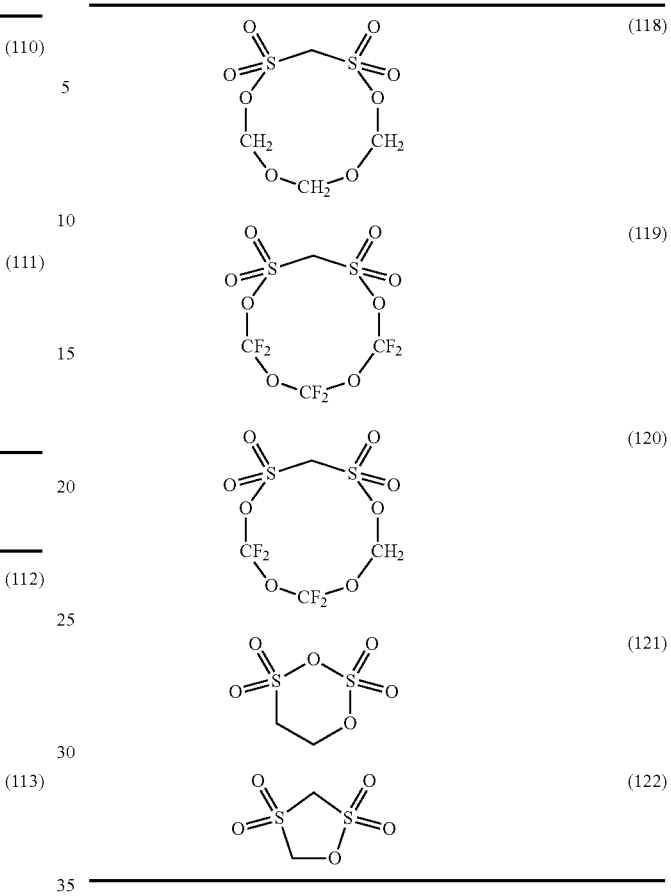

The cyclic sulfonic acid ester compound can be produced using, for example, production methods described in U.S. Pat. No. 4,950,768 (JP61-501089A, JP5-44946B), JP2005-336155A, and the like.

The cyclic sulfonic acid ester compound is preferably a cyclic disulfonic acid ester compound represented by the following formula (11):

Formula 9

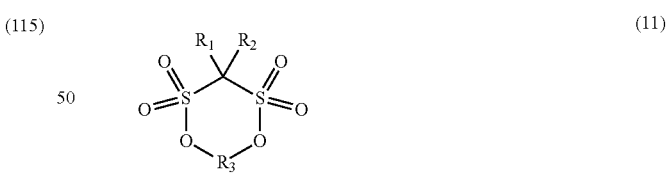

(In formula (11), $R_1$ and $R_2$ each independently represent a hydrogen atom, a linear or branched alkyl group having 1 to 5 carbon atoms, a linear or branched fluoroalkyl group having 1 to 5 carbon atoms, a halogen atom, or an amino group; and $R_3$ represents a linear or branched alkylene group having 1 to 6 carbon atoms, a linear or branched fluoroalkylene group having 1 to 6 carbon atoms, a carbonyl group, a sulfinyl group, a sulfonyl group, or a divalent group having 2 to 6 carbon atoms in which a linear or branched alkylene group or a linear or branched fluoroalkylene group is bonded via an ether bond.)

In formula (11), examples of the halogen atom include a fluorine atom, a chlorine atom, and a bromine atom.

In formula (11), the alkyl group of $R_1$ or $R_2$ can be linear or branched. The fluoroalkyl groups of $R_1$ and $R_2$ can be linear or branched. The alkyl group and fluoroalkyl group of $R_3$ can be linear or branched.

Examples of the alkyl group of $R_1$ or $R_2$ include a methyl group, an ethyl group, a propyl group, a butyl group, or a pentyl group. Among these, a methyl group, an ethyl group, or a propyl group is preferred.

The number of carbon atoms of the alkyl group or fluoroalkyl group of $R_1$ or $R_2$ is preferably 1, 2, 3, or 4.

In formula (11), $R_3$ is preferably a linear or branched alkylene group having 1 to 6 carbon atoms, or a linear or branched fluoroalkylene group having 1 to 6 carbon atoms. The number of carbon atoms of the alkylene group is preferably 1, 2, 3, 4, or 5, more preferably 1, 2, or 3, and further preferably 1 or 2. The number of carbon atoms of the fluoroalkylene group is preferably 1, 2, 3, 4, or 5, more preferably 1, 2, or 3, and further preferably 1 or 2. Examples of the alkylene group include a methylene group and an ethylene group. Examples of the fluoroalkylene group include a monofluoromethylene group, a difluoromethylene group, a monofluoroethylene group, a difluoroethylene group, a trifluoroethylene group, or a tetrafluoroethylene group.

Examples of the cyclic disulfonic acid ester compound represented by formula (11) include compounds in which $R_1$ is a hydrogen atom, $R_2$ is an alkyl group having 1 to 5 carbon atoms (preferably an alkyl group having 1 to 3 carbon atoms), and $R_3$ is a methylene group or an ethylene group (preferably a methylene group). More specific examples include a compound in which $R_1$ is a hydrogen atom, $R_2$ is a methyl group, and $R_3$ is a methylene group, and a compound in which $R_1$ is a hydrogen atom, $R_2$ is a methyl group, and $R_3$ is an ethylene group.

In formula (11), it is preferred that $R_1$ and $R_2$ are each independently a hydrogen atom or a fluorine atom, and $R_3$ is a methylene group, an ethylene group, a fluoromethylene group, or a fluoroethylene group.

The cyclic disulfonic acid ester compound can be used alone, or in combination of two or more cyclic disulfonic acid ester compounds.

Specific examples of the cyclic disulfonic acid ester compound are shown below, but the cyclic sulfonic acid ester compound in the present exemplary embodiment is not limited to these.

Formula 10

(1001)

Formula 11

(1002)

Formula 12

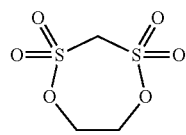

(1003)

Formula 13

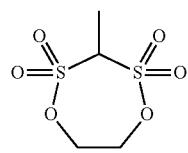

(1004)

Formula 14

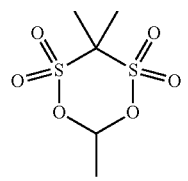

(1005)

Formula 15

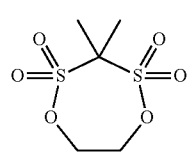

(1006)

Formula 16

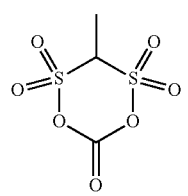

(1007)

Formula 17

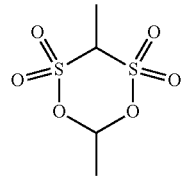

Formula 18

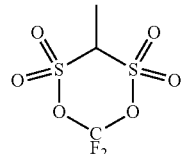

Formula 19

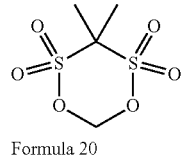

Formula 20

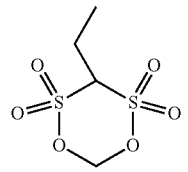

Formula 21

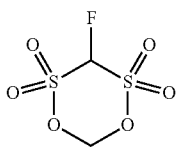

The cyclic disulfonic acid ester compound represented by formula (11) can be produced using, for example, production methods described in U.S. Pat. No. 4,950,768 (JP61-501089A, JP5-44946B), JP2005-336155A, and the like.

The content of the cyclic sulfonic acid ester compound represented by formula (1) in the electrolytic solution is not particularly limited but is preferably 0.005 to 10% by mass. When the content of the cyclic sulfonic acid ester compound is 0.005% by mass or more, a film formation effect can be sufficiently obtained. In addition, when the content of the cyclic sulfonic acid ester compound is 10% by mass or less, an increase in the viscosity of the electrolytic solution and an accompanying increase in resistance can be suppressed. The content of the cyclic sulfonic acid ester compound in the electrolytic solution is more preferably 0.01% by mass or more, further preferably 0.1% by mass or more, and particularly preferably 0.5% by mass or more. In addition, the content of the cyclic sulfonic acid ester compound in the electrolytic solution is more preferably 8% by mass or less, further preferably 5% by mass or less, and particularly preferably 3% by mass or less.

<Acid Anhydride>

The acid anhydride in the present exemplary embodiment is a compound having at least one acid anhydride structure in one molecule, and the type of the acid anhydride is not limited. In addition, the acid anhydride can be a compound having a plurality of acid anhydride structures in one molecule. Examples of the acid anhydride in the present exemplary embodiment include anhydrides of carboxylic acids, anhydrides of sulfonic acids, and anhydrides of carboxylic acids and sulfonic acids.

Concrete examples of the carboxylic anhydrides include acetic anhydride, propionic anhydride, butyric anhydride, succinic anhydride, crotonic anhydride, trifluoroacetic anhydride, pentafluoropropionic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, 4-cyclohexene-1,2-dicarboxylic anhydride, 3,4,5,6-tetrahydrophthalic anhydride, 5-norbornene-2,3-dicarboxylic anhydride, phenylsuccinic anhydride, 2-phenylglutaric anhydride, phthalic anhydride, pyromellitic anhydride, fluorosuccinic anhydride, and tetrafluorosuccinic anhydride. These can be used alone, or in combination of two or more thereof.

Concrete examples of the sulfonic anhydrides include methanesulfonic anhydride, ethanesulfonic anhydride, propanesulfonic anhydride, butanesulfonic anhydride, pentanesulfonic anhydride, hexanesulfonic anhydride, vinylsulfonic anhydride, benzenesulfonic anhydride, trifluoromethanesulfonic anhydride, 2,2,2-trifluoroethanesulfonic anhydride, pentafluoroethanesulfonic anhydride, 1,2-ethanedisulfonic anhydride, 1,3-propanedisulfonic anhydride, 1,4-butanedisulfonic anhydride, 1,2-benzenedisulfonic anhydride, tetrafluoro-1,2-ethanedisulfonic anhydride, hexafluoro-1,3-propanedisulfonic anhydride, octafluoro-1,4-butanedisulfonic anhydride, 3-fluoro-1,2-benzenedisulfonic anhydride, 4-fluoro-1,2-benzenedisulfonic anhydride and 3,4,5,6-tetrafluoro-1,2-benzenedisulfonic anhydride. These can be used alone, or with mixing two or more thereof.

Concrete examples of the anhydrides of carboxylic acids and sulfonic acids include acetic methanesulfonic anhydride, acetic ethanesulfonic anhydride, acetic propanesulfonic anhydride, propionic methanesulfonic anhydride, propionic ethanesulfonic anhydride, propionic propanesulfonic anhydride, trifluoroacetic methanesulfonic anhydride, trifluoroacetic ethanesulfonic anhydride, trifluoroacetic propanesulfonic anhydride, acetic trifluoromethanesulfonic anhydride, acetic 2,2,2-trifluoroethanesulfonic anhydride, acetic pentafluoroethanesulfonic anhydride, trifluoroacetic trifluoromethanesulfonic anhydride, trifluoroacetic 2,2,2-trifluoroethanesulfonic anhydride, trifluoroacetic pentafluoroethanesulfonic anhydride, 3-sulfopropionic anhydride, 2-methyl-3-sulfopropionic anhydride, 2,2-dimethyl-3-sulfopropionic anhydride, 2-ethyl-3-sulfopropionic anhydride, 2,2-diethyl-3-sulfopropionic anhydride, 2-fluoro-3-sulfopropionic anhydride, 2,2-difluoro-3-sulfopropionic anhydride, 2,2,3,3-tetrafluoro-3-sulfopropionic anhydride, 2-sulfobenzoic anhydride, 3-fluoro-2-sulfobenzoic anhydride, 4-fluoro-2-sulfobenzoic anhydride, 5-fluoro-2-sulfobenzoic anhydride, 6-fluoro-2-sulfobenzoic anhydride, 3,6-difluoro-2-sulfobenzoic anhydride, 3,4,5,6-tetrafluoro-2-sulfobenzoic anhydride, 3-trifluoromethyl-2-sulfobenzoic anhydride, 4-trifluoromethyl-2-sulfobenzoic anhydride, 5-trifluoromethyl-2-sulfobenzoic anhydride, and 6-trifluoromethyl-2-sulfobenzoic anhydride. These can be used alone, or with mixing two or more thereof.

The acid anhydride is preferably a carboxylic anhydride. In addition, the carboxylic anhydride is preferably a chain carboxylic anhydride represented by the following formula (I) or a cyclic carboxylic anhydride represented by the following formula (II) or (III).

Formula 22

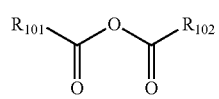

(I)

(In formula (I), $R_{101}$ and $R_{102}$ each independently represent a substituted or unsubstituted alkyl group having 1 to 6 carbon atoms, a substituted or unsubstituted aryl group having 6 to 12 carbon atoms, a substituted or unsubstituted heterocyclic group having 4 to 12 carbon atoms, or a substituted or unsubstituted alkenyl group having 2 to 6 carbon atoms.)

In $R_{101}$ and $R_{102}$ in formula (I), the number of carbon atoms of the alkyl group is preferably 1, 2, 3, 4, or 5, more preferably 1, 2, 3, or 4. The number of carbon atoms of the aryl group is preferably 6, 7, 8, 9, or 10. The number of carbon atoms of the heterocyclic group is preferably 4, 5, 6, 7, 8, 9, or 10, more preferably 4, 5, 6, 7, or 8. The number of carbon atoms of the alkenyl group is preferably 2, 3, 4, or 5, more preferably 2, 3, or 4. In addition, the alkyl group or the alkenyl group can be linear or branched.

The substituents on $R_{101}$ and $R_{102}$ are each, for example, an alkyl group having 1 to 5 carbon atoms (e.g., a methyl group, an ethyl group, a propyl group, an isopropyl group, or a butyl group), a cycloalkyl group having 3 to 6 carbon atoms (e.g., a cyclopropyl group, a cyclobutyl group, a cyclopentyl group, or a cyclohexyl group), an alkynyl group having 2 to 5 carbon atoms (e.g., an acetylenyl group, a 1-propynyl group, a 2-propynyl group, or a 2-butynyl group), an alkoxy group having 1 to 5 carbon atoms (e.g., a methoxy group, an ethoxy group, a n-propoxy group, an iso-propoxy group, a n-butoxy group, or a tert-butoxy group), an alkylcarbonyl group having 2 to 6 carbon atoms, an arylcarbonyl group having 7 to 11 carbon atoms, an alkoxycarbonyl group having 2 to 6 carbon atoms (e.g., a methoxycarbonyl group, an ethoxycarbonyl group, or a tert-butoxycarbonyl group), an aryloxycarbonyl group having 7 to 11 carbon atoms, an alkylcarbonyloxy group having 2 to 6 carbon atoms, an arylcarbonyloxy group having 7 to 11 carbon atoms, an aryl group having 6 to 12 carbon atoms (e.g., a phenyl group or a naphthyl group), an aryloxy group having 6 to 10 carbon atoms (e.g., a phenoxy group or a naphthoxy group), an alkylthio group having 1 to 5 carbon atoms (e.g., a methylthio group, an ethylthio group, a n-propylthio group, an iso-propylthio group, a n-butylthio group, or a tert-butylthio group), an arylthio group having 6 to 10 carbon atoms (e.g., a phenylthio group or a naphthylthio group), an alkylthiocarbonyl group having 2 to 6 carbon atoms, an arylthiocarbonyl group having 7 to 11 carbon atoms, an alkylsulfinyl group having 1 to 5 carbon atoms, an arylsulfinyl group having 6 to 10 carbon atoms, an alkylsulfonyl group having 1 to 5 carbon atoms, an arylsulfonyl group having 6 to 10 carbon atoms, a heteroatom-containing aromatic ring group having 4 to 8 carbon atoms (e.g., a furyl group or a thienyl group), an amino group (including a dimethylamino group and a methylamino group), a carboxy group, a hydroxy group, a cyano group, or a halogen atom (e.g., a chlorine atom or a bromine atom). $R_{101}$ and $R_{102}$ can each independently have one substituent or a plurality of substituents.

The acid anhydride can be used alone, or with mixing two or more thereof.

In formula (I), $R_{101}$ and $R_{102}$ are each independently preferably an alkyl group having 1 to 5 carbon atoms. The alkyl group can be linear or branched. The number of carbon atoms of the alkyl group is preferably 1, 2, 3, or 4.

Specific examples of the chain carboxylic anhydride represented by formula (I) include the following compounds:

Formula 23

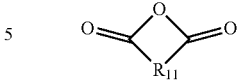
(2001)

Formula 24

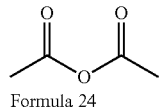
(2002)

Formula 25

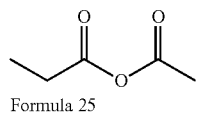
(2003)

Formula 26

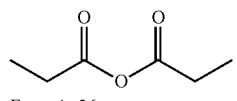
(2004)

Formula 27

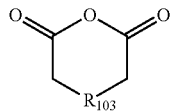
(II)

(In formula (II), $R_{11}$ represents a substituted or unsubstituted alkylene group having 1 to 5 carbon atoms, a substituted or unsubstituted alkenylene group having 2 to 5 carbon atoms, a substituted or unsubstituted cycloalkanediyl group having 5 to 12 carbon atoms, a substituted or unsubstituted benzenediyl group, or a divalent group having 2 to 6 carbon atoms in which an alkylene group is bonded via an ether bond.)

Formula 28

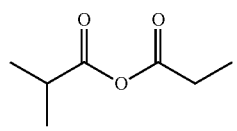
(III)

(In formula (III), $R_{103}$ represents a single bond, a double bond, a substituted or unsubstituted alkylene group having 1 to 3 carbon atoms, a substituted or unsubstituted alkenylene group having 2 to 3 carbon atoms, an oxygen atom, or a divalent group having 2 to 4 carbon atoms in which an alkylene group is bonded via an ether bond.)

In formula (II) or (III), the alkylene groups and alkenylene groups of $R_{11}$ and $R_{103}$ can be linear or branched.

In formula (II), the number of carbon atoms of the alkylene group of $R_{11}$ is preferably 1, 2, 3, or 4. The number of carbon atoms of the alkenylene group of $R_{11}$ is preferably 2, 3, or 4.

In formula (II), the number of carbon atoms of the cycloalkanediyl group of $R_{11}$ is preferably 5, 6, 7, 8, 9, or 10.

In formula (II), $R_{11}$ is preferably a substituted or unsubstituted alkylene group having 2 to 5 carbon atoms, or a substituted or unsubstituted alkenylene group having 2 to 5 carbon atoms.

In formula (II) or (III), the substituent on $R_{11}$ or $R_{103}$ is, for example, an alkyl group having 1 to 5 carbon atoms (e.g., a methyl group, an ethyl group, a propyl group, an isopropyl group, or a butyl group), an alkenyl group having 2 to 6 carbon atoms (e.g., a vinyl group, a 1-propenyl group, a 2-propenyl group, or a 2-butenyl group), an alkoxy group having 1 to 5 carbon atoms (e.g., a methoxy group, an ethoxy group, a n-propoxy group, an iso-propoxy group, a n-butoxy group, or a tert-butoxy group), an amino group (including a dimethylamino group and a methylamino group), a carboxy group, a hydroxy group, a vinyl group, a cyano group, or a halogen atom (e.g., a chlorine atom or a bromine atom). $R_{11}$ or $R_{103}$ can have one substituent or a plurality of substituents.

A case where $R_{103}$ is a single bond or a double bond indicates that a single bond or a double bond is formed between the carbon atoms adjacent to $R_{103}$.

In formula (III), $R_{103}$ is preferably a single bond, a double bond, a substituted or unsubstituted alkylene group having 1 to 5 carbon atoms, or a substituted or unsubstituted alkenylene group having 2 to 5 carbon atoms.

Concrete examples of the cyclic carboxylic anhydride represented by formula (II) include the following compounds:

Formula 29

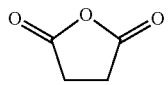
(3001)

Formula 30

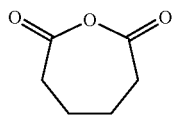
(3002)

As the chain carboxylic anhydride, acetic anhydride, propionic anhydride, and butyric anhydride are preferred.

As the cyclic carboxylic anhydride, succinic anhydride is preferred.

The content of the acid anhydride in the electrolytic solution is not particularly limited but is preferably 0.005 to 10% by mass. When the content of the acid anhydride is 0.005% by mass or more, the synergistic effect of the cyclic sulfonic acid ester compound and the acid anhydride can be effectively obtained. In addition, when the content of the acid anhydride is 10% by mass or less, the formation of a thick film due to the decomposition of the acid anhydride can be suppressed, and resistance increase due to the film can be suppressed. In addition, water in the negative electrode can be effectively captured. The content of the acid anhydride in the electrolytic solution is more preferably 0.01% by mass or more, further preferably 0.1% by mass or more, and particularly preferably 0.5% by mass or more. In addition, the content of the acid anhydride in the electrolytic solution is more preferably 8% by mass or less, further preferably 5% by mass or less, and particularly preferably 3% by mass or less.

In the present exemplary embodiment, the molar ratio B/A of the concentration B of the acid anhydride in the electrolytic solution to the concentration A of the cyclic sulfonic acid ester compound in the electrolytic solution is preferably in the range of 1/10 to 10/1, more preferably in the range of 1/9 to 5/1, and particularly preferably in the range of 3/10 to 2/1.

In addition, the total content C of the concentration A of the cyclic sulfonic acid ester compound in the electrolytic solution and the concentration B of the acid anhydride in the electrolytic solution is preferably in the range of 1.5 mol/L or less, more preferably in the range of 1.0 mol/L or less, and further preferably in the range of 0.5 mol/L or less. By setting the concentration A of the cyclic sulfonic acid ester compound and the concentration B of the acid anhydride in such ranges, a gas generation suppression effect can be more effectively obtained.

In addition, any other additives except for the cyclic sulfonic acid ester compound and the acid anhydride can also be included in the electrolytic solution as needed. Examples of the other additives include overcharge-preventing agents and surfactants.

<Nonaqueous Solvent>

The nonaqueous solvent is not particularly limited. Examples thereof include carbonates such as cyclic carbonates and chain carbonates, aliphatic carboxylates, γ-lactones, cyclic ethers, chain ethers, and fluorine derivatives thereof. These can be used alone, or in combination of two or more thereof.

Examples of the cyclic carbonates include propylene carbonate (PC), ethylene carbonate (EC), butylene carbonate (BC), and vinylene carbonate (VC).

Examples of the chain carbonates include dimethyl carbonate (DMC), diethyl carbonate (DEC), ethyl methyl carbonate (EMC), and dipropyl carbonate (DPC).

Examples of the aliphatic carboxylates include methyl formate, methyl acetate, and ethyl propionate.

Examples of the γ-lactones include γ-butyrolactone.

Examples of the cyclic ethers include tetrahydrofuran and 2-methyltetrahydrofuran.

Examples of the chain ethers include 1,2-diethoxyethane (DEE) and ethoxymethoxyethane (EME).

In addition, examples of the nonaqueous solvent include dimethyl sulfoxide, 1,3-dioxolane, formamide, acetamide, dimethylformamide, acetonitrile, propylnitrile, nitromethane, ethyl monoglyme, phosphoric triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, N-methylpyrrolidone, fluorinated carboxylates, methyl-2,2,2-trifluoroethyl carbonate, methyl-2,2,3,3,3-pentafluoropropyl carbonate, trifluoromethylethylene carbonate, monofluoromethylethylene carbonate, difluoromethylethylene carbonate, 4,5-difluoro-1,3-dioxolan-2-one, and monofluoroethylene carbonate. These can be used alone, or in combination of two or more thereof.

The nonaqueous solvent preferably includes a carbonate. The carbonates include cyclic carbonates or chain carbonates. Advantages of the carbonates are that the relative dielectric constant is large, and therefore the ion dissociation properties of the electrolytic solution improve, and further the viscosity of the electrolytic solution decreases, and therefore the ion mobility improves. But, when the carbonate having a carbonate structure is used as the nonaqueous solvent of the electrolytic solution, the carbonate tends to decompose to generate a gas including $CO_2$. Particularly in the case of a stacking laminate type secondary battery, when a gas is produced inside the battery, the problem of swelling emerges significantly, easily leading to performance decrease. Therefore, in the present exemplary embodiment, by adding the cyclic sulfonic acid ester compound and the acid anhydride in the present exemplary embodiment to the nonaqueous solvent comprising the carbonate, an SEI film formed of these compounds can suppress the decomposition of the carbonate and suppress the generation of a gas. Therefore, in the present exemplary embodiment, the electrolytic solution preferably includes the carbonate as the nonaqueous solvent in addition to the cyclic sulfonic acid ester compound and the acid anhydride. By such a composition, even if the carbonate is used as the nonaqueous solvent, gas generation can be reduced, and a secondary battery having excellent performance can be provided. The content of the carbonate in the electrolytic solution is, for example, 30% by mass or more, preferably 50% by mass or more, and more preferably 70% by mass or more.

<Supporting Salt>

The supporting salt is not particularly limited. Examples thereof include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, and $LiN(CF_3SO_2)_2$. The supporting salt can be used alone, or in combination of two or more thereof.

The concentration of the supporting salt in the electrolytic solution is preferably 0.5 to 1.5 mol/l. By setting the concentration of the supporting salt in this range, the density, viscosity, electrical conductivity, and the like are easily adjusted in suitable ranges.

[2] Negative Electrode

A secondary battery in the present exemplary embodiment possesses a negative electrode including a negative electrode active material. The negative electrode active material can be bound on a negative electrode current collector with a negative electrode binder. As the negative electrode, for example, a negative electrode current collector on which a negative electrode active material layer including a negative electrode active material and a negative electrode binder is formed can be used.

The negative electrode active material is not particularly limited. Examples thereof include lithium metal, metals (a) capable of being alloyed with lithium, metal oxides (b) capable of storing and releasing lithium ions, or carbon materials (c) capable of intercalating and deintercalating lithium ions. The negative electrode active material can be used alone, or in combination of two or more thereof.

Examples of the metals (a) include Al, Si, Pb, Sn, In, Bi, Ag, Ba, Ca, Hg, Pd, Pt, Te, Zn, La, or alloys of two or more thereof. Two or more of these metals or alloys can be mixed and used. These metals or alloys can contain one or more nonmetal elements. Among these, silicon, tin, or alloys thereof are preferably used as the negative electrode active material. By using silicon or tin as the negative electrode active material, a lithium secondary battery having excellent weight energy density and volume energy density can be provided.

Examples of the metal oxides (b) include silicon oxide, aluminum oxide, tin oxide, indium oxide, zinc oxide, lithium oxide, or composites thereof. Among these, silicon oxide is preferably used as the negative electrode active material. In addition, the metal oxides (b) can contain one or two or more elements selected from among nitrogen, boron, and sulfur, for example, in the range of 0.1 to 5% by mass.

Examples of the carbon materials (c) include graphite, noncrystalline carbon, diamond-like carbon, carbon nanotubes, or composites thereof.

The negative electrode binder is not particularly limited. Examples thereof include polyvinylidene fluoride, vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, polyamideimides, and polyacrylic acid.

The negative electrode can be fabricated, for example, by forming a negative electrode active material layer comprising a negative electrode active material and a negative electrode binder on a negative electrode current collector. This negative electrode active material layer can be formed by a general slurry application method. Specifically, the negative electrode can be obtained by preparing slurry composed of a negative electrode active material, a negative electrode binder and a solvent, applying the slurry on a negative electrode current collector, drying it, and applying pressure as needed. Examples of the method for applying the negative electrode slurry include a doctor blade method, a die coater method, and a dip coating method. The negative electrode can also be obtained by previously forming a negative electrode active material layer and then forming a thin film of copper, nickel, or an alloy thereof as a current collector by a method such as vapor deposition or sputtering.

In addition, as the negative electrode binder, water-dispersible polymers are preferably used. The negative electrode binder can be used in an aqueous dispersion state. Examples of the water-dispersible polymers include styrene butadiene-based polymers, acrylic acid-based polymers, polytetrafluoroethylene, polyacrylates, and polyurethanes. These polymers can be dispersed in water and used. More specific examples of the water-dispersible polymers include natural rubbers (NR), styrene butadiene rubbers (SBR), acrylonitrile-butadiene copolymer rubbers (NBR), methyl methacrylate-butadiene copolymer rubbers (MBR), chloroprene rubbers (CR), acrylic rubbers (ABR), styrene butadiene-styrene copolymers (SBS), butyl rubbers (IIR), Thiokol, urethane rubbers, silicon rubbers, or fluoro rubbers. These can be used alone, or in combination of two or more thereof.

In addition, when the water-dispersible polymer is used as the negative electrode binder, a water-compatible thickening agent is preferably used. Examples of the water-compatible thickening agent can include methyl cellulose, carboxymethyl cellulose (CMC), carboxymethyl cellulose sodium salt, carboxymethyl cellulose lithium salt, hydroxyethyl cellulose, polyethylene oxide, polyvinyl alcohol (PVA), polyvinylpyrrolidone, sodium polyacrylate, polyacrylic acid, polyethylene glycol, or polyethylene oxide. These can be used alone, or in combination of two or more thereof.

The amount of the negative electrode binder is preferably 5 to 25 parts by mass based on 100 parts by mass of the negative electrode active material.

The content of the water-compatible thickening agent is, for example, 0.1 to 5.0 parts by mass, preferably 0.5 to 3.0 parts by mass, based on 100 parts by mass of the negative electrode active material.

As the dispersion medium, water is preferably used, and in addition to water, a water-soluble solvent such as an alcohol-based solvent, an amine-based solvent, a carboxylic acid-based solvent, or a ketone-based solvent may be included as the dispersion medium.

The negative electrode can be fabricated, for example, as follows. First, a negative electrode active material, a water-compatible thickening agent, a water-dispersible polymer, and water are kneaded to prepare slurry of a negative electrode. Next, this aqueous slurry is applied to a negative electrode current collector and dried followed by pressing to fabricate a negative electrode.

The amount of water included in the negative electrode active material layer after the negative electrode is fabricated is preferably 50 to 1000 ppm. In addition, the amount of water included in the negative electrode active material layer is more preferably 500 ppm or less. In the present exemplary embodiment, the acid anhydride not only has the synergistic effect with the cyclic disulfonic acid ester compound as described above but has the effect of capturing water in the electrolytic solution or in the negative electrode active material layer. Therefore, when the acid anhydride captures water, the deterioration of the film formed on the negative electrode is suppressed, and a stronger and more stable film can be obtained. Therefore, in the present exemplary embodiment, when the amount of water included in the negative electrode active material layer is 50 to 1000 ppm, a better effect can be obtained.

The amount of water included in the negative electrode active material layer can be measured, for example, by a coulometric titration method using a Karl Fischer measuring instrument.

The amount of water included in the negative electrode active material layer can be controlled, for example, by drying after the negative electrode active material layer has been formed, and environmental humidity after the drying. The environmental humidity is preferably a dew point of −40 to 10° C.

As the negative electrode current collector, aluminum, nickel, stainless steel, chromium, copper, silver, and alloys thereof are preferred in terms of electrochemical stability. Examples of its shape include foil, a flat plate shape, and a mesh shape.

The negative electrode active material layer can include a conductive aid such as carbon from the viewpoint of improving conductivity.

The negative electrode slurry may contain other components as needed. Examples of the other components include surfactants and defoaming materials. When the negative electrode slurry contains a surfactant, the dispersion stability of the negative electrode binder can be improved. In addition, when the negative electrode slurry contains a defoaming agent, foaming when the slurry containing the surfactant is applied can be suppressed.

[3] Positive Electrode

The secondary battery in the present exemplary embodiment possesses a positive electrode including a positive electrode active material. The positive electrode active material can be bound on a positive electrode current collector with a positive electrode binder. For the positive electrode, a positive electrode current collector on which a positive electrode active material layer including a positive electrode active material and a positive electrode binder is formed can be used.

The positive electrode active material is not particularly limited. Examples thereof include lithium complex oxides and iron lithium phosphate. In addition, those in which at least parts of the transition metals of these lithium complex oxides are replaced by other elements may be used. In addition, lithium complex oxides with a plateau at a metallic-lithium counter electrode potential of 4.2 V or more can also be used. Examples of the lithium complex oxides include spinel-type lithium manganese complex oxides, olivine-type lithium-containing complex oxides, and inverse-spinel-type lithium-containing complex oxides.

Examples of the lithium complex oxides include lithium manganate having a layered structure or lithium manganate having a spinel structure such as $LiMnO_2$ or $Li_xMn_2O_4$ ($0<x<2$), or those in which part of the Mn of these lithium manganates is replaced with at least one element selected from the group consisting of Li, Mg, Al, Co, B, Ti, and Zn; lithium cobaltate such as $LiCoO_2$, or those in which part of the Co of lithium cobaltate is replaced with at least one element selected from the group consisting of Ni, Al, Mn, Mg, Zr, Ti, and Zn; lithium nickelate such as $LiNiO_2$, or those in which part of the Ni of lithium nickelate is replaced with at least one element selected from the group consisting of Co, Al, Mn, Mg, Zr, Ti, and Zn; lithium-transition metal-oxides in which particular transition metals do not exceed half, such as $LiNi_{1/3}Co_{1/3}Mn_{1/3}O_2$, or those in which parts of the transition metals of the lithium-transition metal-oxides are replaced with at least one other element selected from the group consisting of Co, Al, Mn, Mg, and Zr; and these lithium-transition metal-oxides in which Li is more excessive than in stoichiometric compositions. Particularly, as the lithium complex oxides, $Li_\alpha Ni_\beta Co_\gamma Al_\delta O_2$ ($1 \leq \alpha \leq 1.2$, $\beta+\gamma+\delta=1$, $\beta \geq 0.7$, and $\gamma \leq 0.2$) or $Li_\alpha Ni_\beta Co_\gamma Mn_\delta O_2$ ($1 \leq \alpha \delta 1.2$, $\beta+\gamma+\delta=1$, $\beta \geq 0.4$, and $\gamma \leq 0.4$), or those in which parts of the transition metals of these complex oxides are replaced with at least one element selected from the group consisting of Al, Mg, and Zr are preferred. The lithium complex oxide can be used alone, or in combination of two or more thereof.

Preferred examples of the lithium complex oxides include compounds represented by the following formula:

$$Li_a(M_xMn_{2-x})O_4$$

(In the above formula, x satisfies $0<x<2$, a satisfies $0<a<1.2$, and M is at least one element selected from the group consisting of Ni, Co, Fe, Cr, and Cu.)

In addition, as the positive electrode active material, active materials that work at potentials of 4.5 V or more versus lithium (hereinafter also referred to as 5V-class active materials) can be used from the viewpoint that high voltage is obtained. When a 5V-class active material is used, gas generation due to the decomposition of the electrolytic solution, and the like occurs easily, but by using the electrolytic solution comprising the compounds in the present exemplary embodiment, gas generation can be suppressed.

As the 5V-class active materials, for example, lithium manganese complex oxides represented by the following formula (A) can be used.

$$Li_a(M_xMn_{2-x-y}Y_y)(O_{4-w}Z_w) \tag{A}$$

(In formula (A), $0.4 \leq x \leq 1.2$, $0 \leq y$, $x+y<2$, $0 \leq a \leq 1.2$, and $0 \leq w \leq 1$; M is at least one kind selected from the group consisting of Co, Ni, Fe, Cr, and Cu; Y is at least one kind selected from the group consisting of Li, B, Na, Mg, Al, Ti, Si, K, and Ca; and Z is at least one kind selected from the group consisting of F and Cl.)

In addition, as the 5V-class active materials, among such metal complex oxides, spinel-type compounds represented by the following formula (B) are preferably used from the viewpoint of obtaining sufficient capacity and achieving longer life.

$$LiNi_xMn_{2-x-y}A_yO_4 \tag{B}$$

(In formula (B), $0.4<x<0.6$, $0 \leq y<0.3$, and A is at least one kind selected from the group consisting of Li, B, Na, Mg, Al, Ti, and Si.)

In formula (B), $0 \leq y<0.2$ is more preferred.

In addition, examples of the active materials that operate at potentials of 4.5 V or more versus lithium include olivine-type positive electrode active materials. Examples of the olivine-type 5V-class active materials include $LiCoPO_4$ or $LiNiPO_4$.

In addition, examples of the active materials that work at potentials of 4.5 V or more versus lithium include Si complex oxides. Examples of such Si complex oxides include compounds represented by the following formula (C):

$$Li_2MSiO_4 \tag{C}$$

(In formula (C), M is at least one kind selected from the group consisting of Mn, Fe, and Co.)

In addition, the active materials that work at potentials of 4.5 V or more versus lithium may comprise layered structures. Examples of the 5V-class active materials having layered structures include compounds represented by the following formula (D):

$$Li(M1_xM2_yMn_{2-x-y})O_2 \tag{D}$$

(In formula (D), M1 is at least one kind selected from the group consisting of Ni, Co, and Fe; M2 is at least one kind selected from the group consisting of Li, Mg, and Al; and $0.1<x<0.5$ and $0.05<y<0.3$.)

As the 5V-class active materials, lithium metal complex oxides represented by the following (E) to (G) can be used.

$$LiMPO_4 \tag{E}$$

(In formula (E), M is at least one kind selected from the group consisting of Co and Ni.)

$$Li(M_yMn_z)O_2 \quad (F)$$

(In formula (F), $0.1 \le y \le 0.5$, $0.33 \le z \le 0.7$, and M is at least one kind selected from the group consisting of Li, Co, and Ni.)

$$Li(Li_xM_yMn_z)O_2 \quad (G)$$

(In formula (G), $0.1 \le x < 0.3$, $0.1 \le y \le 0.4$, $0.33 \le z \le 0.7$, and M is at least one kind selected from the group consisting of Li, Co, and Ni.)

The positive electrode can be fabricated, for example, as follows. First, a positive electrode slurry containing a positive electrode active material, a positive electrode binder, and a solvent (and further a conductive auxiliary material as needed) is prepared. This positive electrode slurry is applied on a positive electrode current collector and dried, and pressure is applied as needed, to form a positive electrode active material layer on the positive electrode current collector to fabricate a positive electrode.

The positive electrode binder is not particularly limited, and, for example, the same ones as the negative electrode binder can be used. From the viewpoint of general versatility and low cost, polyvinylidene fluoride is preferred. The content of the positive electrode binder is preferably in the range of 1 to 25 parts by mass, more preferably in the range of 2 to 20 parts by mass, and further preferably in the range of 2 to 10 parts by mass based on 100 parts by mass of the positive electrode active material from the viewpoint of binding force and energy density in a trade-off relationship. Examples of binders other than polyvinylidene fluoride (PVdF) include vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, or polyamideimides. As the solvent, for example, N-methyl-2-pyrrolidone (NMP) can be used.

The positive electrode current collector is not particularly limited. Examples thereof include aluminum, titanium, tantalum, nickel, silver, or alloys thereof. Examples of the shape of the positive electrode current collector include foil, a flat plate shape, and a mesh shape. As the positive electrode current collector, aluminum foil can be preferably used.

In the fabrication of the positive electrode, a conductive auxiliary material can be added for the purpose of decreasing impedance. Examples of the conductive auxiliary material include carbonaceous fine particles such as graphite, carbon black, and acetylene black.

[4] Separator

The separator is not particularly limited, and, for example, porous films and nonwoven fabrics of polypropylene, polyethylene, and the like can be used. In addition, as the separator, ceramic-coated separators in which coatings comprising ceramics are formed on polymer base materials used as separators can also be used. In addition, as the separator, their stacks can also be used.

[5] Outer Package

The outer package is not particularly limited, and, for example, laminate films can be used. For example, in the case of a stacking laminate-type secondary battery, laminate films of aluminum, silica-coated polypropylene, polyethylene, and the like can be used.

In the case of a secondary battery using a laminate film as an outer package, when a gas is generated, the distortion of the electrode stack is very large compared with a secondary battery using a metal can as the package. This is because the laminate film is easily deformed by the internal pressure of the secondary battery compared with the metal can. Further, when the secondary battery using a laminate film as the package is sealed, usually, the battery internal pressure is set lower than atmospheric pressure, and therefore there is no extra space inside, and when a gas is generated, it easily immediately leads to the volume change of the battery and the deformation of the electrode stack. But, the secondary battery according to the present exemplary embodiment can overcome such problems by using the electrolytic solution in the present exemplary embodiment.

[6] Secondary Battery

As the configuration of the secondary battery according to the present exemplary embodiment, the invention of the present application is not particularly limited. Examples of the configuration can include a configuration in which an electrode stack of which the positive electrode and the negative electrode are disposed opposed to each other and the electrolytic solution are included in the package.

A stacking laminate-type lithium ion secondary battery will be described below as an example. FIG. 1 is a schematic configuration diagram showing one example of the basic configuration of the secondary battery according to the present exemplary embodiment. In the positive electrode, a positive electrode active material layer 1 is formed on a positive electrode current collector 3. In the negative electrode, a negative electrode active material layer 2 is formed on a negative electrode current collector 4. These positive and negative electrodes are disposed opposed to each other via a separator 5. The separator 5 is stacked and disposed generally parallel to the positive electrode active material layer 1 and the negative electrode active material layer 2. The electrode pair of the positive and the negative electrodes and an electrolytic solution are included in packages 6 and 7. A positive electrode tab 9 connected to the positive electrode, and a negative electrode tab 8 connected to the negative electrode are provided so as to be exposed from the packages. The shape of the secondary battery according to the present exemplary embodiment is not particularly limited. Examples thereof include a laminate packaging type, a cylindrical type, a square type, a coin type, and a button type.

EXAMPLES

The exemplary embodiments will be specifically described below by Examples, but the present invention is not limited to:

Example 1

<Negative Electrode>

As a negative electrode active material, graphite was used. This negative electrode active material, styrene-butadiene copolymerized rubber (SBR) as a negative electrode binder, carboxymethyl cellulose (CMC) as a thickening agent, and acetylene black as a conductive auxiliary material were measured at a mass ratio of 96:2:1:1. As the SBR, a rubber particle dispersion (solid content: 40% by mass) was used by measuring so that the solid content of the binder was at the above mass ratio.

Then, these were mixed with water to prepare a negative electrode slurry. The negative electrode slurry was applied to copper foil with a thickness of 10 μm followed by heat treatment for drying at 80° C. under a nitrogen atmosphere for 8 hours. Then, the obtained negative electrode was stored in an environment having a dew point of −10° C. for 3 hours to obtain a negative electrode. Then, the amount of water in the negative electrode active material layer of the negative electrode was measured at a measurement temperature of 150 to 200° C. by a coulometric titration method using a Karl Fischer measuring instrument (manufactured by Mitsubishi Chemical Analytech Co., Ltd.). As a result of the measurement, the amount of water in the negative electrode active material layer was 346 ppm.

<Positive Electrode>

As a positive electrode active material, a mixture of $LiMn_2O_4$ and $LiNi_{0.5}Co_{0.2}Mn_{0.3}O_2$ at a weight ratio of 3:7 was used. This positive electrode active material, carbon black as a conductive auxiliary material, and polyvinylidene fluoride as a positive electrode binder were measured at a mass ratio of 90:5:5. Then, these were mixed with N-methylpyrrolidone to prepare a positive electrode slurry. The positive electrode slurry was applied to aluminum foil with a thickness of 20 μm followed by drying and further pressing to fabricate a positive electrode.

<Electrode Stack>

The obtained positive and negative electrodes were stacked via a polypropylene porous film as a separator. Ends of the positive electrode current collectors not covered with the positive electrode active material and ends of the negative electrode current collectors not covered with the negative electrode active material were each welded. Further, a positive electrode terminal made of aluminum and a negative electrode terminal made of nickel were welded to the welded parts respectively to obtain an electrode stack having a planar stacked structure.

<Electrolytic Solution>

As a nonaqueous solvent, a mixed solvent of EC and DEC (volume ratio: EC/DEC=30/70) was used. The above compound (1001) as a cyclic sulfonic acid ester compound represented by formula (1) was added to the mixed solvent so that the content in an electrolytic solution was 0.8% by mass, the above compound (2001) as an acid anhydride was added to the mixed solvent so that the content in the electrolytic solution was 0.5% by mass, and $LiPF_6$ as a supporting salt was added to the mixed solvent so that the concentration in the electrolytic solution was 1 M, thereby preparing the electrolytic solution.

<Secondary Battery>

The electrode stack was housed in an aluminum laminate film as an outer package, and the electrolytic solution was injected into the inside of the package. Then, while the pressure was reduced to 0.1 atmospheres, the package was sealed to fabricate a lithium ion secondary battery.

<Evaluation>

(Volume Increase Rate after Storage at 45° C. for 1 Week)

The fabricated secondary battery was subjected to charge and discharge once in a thermostatic chamber kept at 45° C. In the charge, the secondary battery was charged at 1 C to 4.15 V, and then subjected to constant voltage charge for 1.5 hours in total, and in the discharge, the secondary battery was subjected to constant current discharge at 1 C to 2.5 V. Then, the secondary battery was stored in the thermostatic chamber kept at 45° C. for 1 week, and the volume increase rate (%) after the storage was measured. The volume was measured using the Archimedes method.

The "volume increase rate (%)" was calculated by (volume after storage for 1 week)/(volume before storage (after one charge and discharge))−1]×100 (unit: %).

The result is shown in Table 3.

Example 2

A secondary battery was fabricated and evaluated as in Example 1 except that the above compound (2002) was used as the acid anhydride instead of the compound (2001). The result is shown in Table 3.

Example 3

A secondary battery was fabricated and evaluated as in Example 1 except that the above compound (2003) was used as the acid anhydride instead of the compound (2001). The result is shown in Table 3.

Example 4

A secondary battery was fabricated and evaluated as in Example 1 except that the above compound (3001) was used as the acid anhydride instead of the compound (2001). The result is shown in Table 3.

Example 5

A secondary battery was fabricated and evaluated as in Example 1 except that the above compound (1002) was used as the cyclic sulfonic acid ester compound instead of the compound (1001). The result is shown in Table 3.

Example 6

A secondary battery was fabricated and evaluated as in Example 2 except that the above compound (1002) was used as the cyclic sulfonic acid ester compound instead of the compound (1001). The result is shown in Table 3.

Example 7

A secondary battery was fabricated and evaluated as in Example 3 except that the above compound (1002) was used as the cyclic sulfonic acid ester compound instead of the compound (1001). The result is shown in Table 3.

Example 8

A secondary battery was fabricated and evaluated as in Example 4 except that the above compound (1002) was used as the cyclic sulfonic acid ester compound instead of the compound (1001). The result is shown in Table 3.

Comparative Example 1

A secondary battery was fabricated and evaluated as in Example 1 except that a cyclic sulfonic acid ester compound and an acid anhydride were not used. The result is shown in Table 3.

Comparative Example 2

A secondary battery was fabricated and evaluated as in Example 1 except that an acid anhydride was not used. The result is shown in Table 3.

Comparative Example 3

A secondary battery was fabricated and evaluated as in Example 1 except that a cyclic sulfonic acid ester compound was not used. The result is shown in Table 3.

TABLE 3

| | Cyclic sulfonic acid ester compound | Acid anhydride | Amount of water (ppm) | Volume increase rate (%) during storage at 45° C. for 1 week |
|---|---|---|---|---|
| Example 1 | Compound 1001 | Compound 2001 | 346 | 2.3 |
| Example 2 | Compound 1001 | Compound 2002 | 346 | 2.4 |
| Example 3 | Compound 1001 | Compound 2003 | 346 | 2.8 |
| Example 4 | Compound 1001 | Compound 3001 | 346 | 3.4 |
| Example 5 | Compound 1002 | Compound 2001 | 346 | 2.9 |
| Example 6 | Compound 1002 | Compound 2002 | 346 | 2.6 |
| Example 7 | Compound 1002 | Compound 2003 | 346 | 2.8 |
| Example 8 | Compound 1002 | Compound 3001 | 346 | 3.2 |
| Comparative Example 1 | — | — | 346 | 4.3 |
| Comparative Example 2 | Compound 1001 | — | 346 | 4.7 |
| Comparative Example 3 | — | Compound 2001 | 346 | 5.4 |

When Comparative Example 1 and Comparative Example 2 are compared, it is found that when a cyclic sulfonic acid ester compound is added to an electrolytic solution, the volume increase rate of the secondary battery tends to increase. In addition, when Comparative Example 1 and Comparative Example 3 are compared, it is found that also when an acid anhydride is added to an electrolytic solution, the volume increase rate of the secondary battery tends to increase.

But, as shown in Examples 1 to 8, it is found that when a cyclic sulfonic acid ester compound and an acid anhydride are added to an electrolytic solution, the volume increase rate of the secondary battery decreases by their synergistic effect. Therefore, it is found that by adding a cyclic sulfonic acid ester compound and an acid anhydride, gas generation can be suppressed.

Example 9

A secondary battery was fabricated and evaluated as in Example 1 except that a negative electrode was fabricated with the environmental humidity and storage time after heat treatment changed. The result is shown in Table 4. When the amount of water in the negative electrode active material layer of the obtained negative electrode was measured, it was 46 ppm.

Example 10

A secondary battery was fabricated and evaluated as in Example 1 except that a negative electrode was fabricated with the environmental humidity and storage time after heat treatment changed. The result is shown in Table 4. When the amount of water in the negative electrode active material layer of the obtained negative electrode was measured, it was 58 ppm.

Example 11

A secondary battery was fabricated and evaluated as in Example 1 except that a negative electrode was fabricated with the environmental humidity and storage time after heat treatment changed. The result is shown in Table 4. When the amount of water in the negative electrode active material layer of the obtained negative electrode was measured, it was 112 ppm.

Example 12

The result of Example 1 is shown in Table 4 as that of Example 12.

Example 13

A secondary battery was fabricated and evaluated as in Example 1 except that a negative electrode was fabricated with the environmental humidity and storage time after heat treatment changed. The result is shown in Table 4. When the amount of water in the negative electrode active material layer of the obtained negative electrode was measured, it was 597 ppm.

Example 14

A secondary battery was fabricated and evaluated as in Example 1 except that a negative electrode was fabricated with the environmental humidity and storage time after heat treatment changed. The result is shown in Table 4. When the amount of water in the negative electrode active material layer of the obtained negative electrode was measured, it was 824 ppm.

Example 15

A secondary battery was fabricated and evaluated as in Example 1 except that a negative electrode was fabricated with the environmental humidity and storage time after heat treatment changed. The result is shown in Table 4. When the amount of water in the negative electrode active material layer of the obtained negative electrode was measured, it was 1046 ppm.

Comparative Example 4

A secondary battery was fabricated and evaluated as in Comparative Example 1 except that the negative electrode obtained in Example 9 was used. The result is shown in Table 4.

Comparative Example 5

A secondary battery was fabricated and evaluated as in Comparative Example 1 except that the negative electrode obtained in Example 10 was used. The result is shown in Table 4.

Comparative Example 6

A secondary battery was fabricated and evaluated as in Comparative Example 1 except that the negative electrode obtained in Example 11 was used. The result is shown in Table 4.

Comparative Example 7

The result of Comparative Example 1 is shown in Table 4 as that of Comparative Example 7.

Comparative Example 8

A secondary battery was fabricated and evaluated as in Comparative Example 1 except that the negative electrode obtained in Example 13 was used. The result is shown in Table 4.

Comparative Example 9

A secondary battery was fabricated and evaluated as in Comparative Example 1 except that the negative electrode obtained in Example 14 was used. The result is shown in Table 4.

Comparative Example 10

A secondary battery was fabricated and evaluated as in Comparative Example 1 except that the negative electrode obtained in Example 15 was used. The result is shown in Table 4.

Comparative Example 11

A secondary battery was fabricated and evaluated as in Comparative Example 2 except that the negative electrode obtained in Example 9 was used. The result is shown in Table 4.

Comparative Example 12

A secondary battery was fabricated and evaluated as in Comparative Example 2 except that the negative electrode obtained in Example 10 was used. The result is shown in Table 4.

Comparative Example 13

A secondary battery was fabricated and evaluated as in Comparative Example 2 except that the negative electrode obtained in Example 11 was used. The result is shown in Table 4.

Comparative Example 14

The result of Comparative Example 2 is shown in Table 4 as that of Comparative Example 14.

Comparative Example 15

A secondary battery was fabricated and evaluated as in Comparative Example 2 except that the negative electrode obtained in Example 13 was used. The result is shown in Table 4.

Comparative Example 16

A secondary battery was fabricated and evaluated as in Comparative Example 2 except that the negative electrode obtained in Example 14 was used. The result is shown in Table 4.

Comparative Example 17

A secondary battery was fabricated and evaluated as in Comparative Example 2 except that the negative electrode obtained in Example 15 was used. The result is shown in Table 4.

TABLE 4

| | Cyclic sulfonic acid ester compound | Acid anhydride | Amount of water (ppm) | Volume increase rate (%) during storage at 45° C. for 1 week |
|---|---|---|---|---|
| Example 9 | Compound 1001 | Compound 2001 | 46 | 4.3 |
| Example 10 | Compound 1001 | Compound 2001 | 58 | 2.8 |
| Example 11 | Compound 1001 | Compound 2001 | 112 | 2.6 |
| Example 12 | Compound 1001 | Compound 2001 | 346 | 2.3 |
| Example 13 | Compound 1001 | Compound 2001 | 597 | 6.3 |
| Example 14 | Compound 1001 | Compound 2001 | 824 | 8.2 |
| Example 15 | Compound 1001 | Compound 2001 | 1046 | 10.3 |
| Comparative Example 4 | — | — | 46 | 4.2 |
| Comparative Example 5 | — | — | 58 | 3.4 |
| Comparative Example 6 | — | — | 112 | 3.5 |
| Comparative Example 7 | — | — | 346 | 4.3 |
| Comparative Example 8 | — | — | 597 | 6.9 |
| Comparative Example 9 | — | — | 824 | 8.9 |
| Comparative Example 10 | — | — | 1046 | 10.1 |
| Comparative Example 11 | Compound 1001 | — | 46 | 6.5 |
| Comparative Example 12 | Compound 1001 | — | 58 | 4.2 |
| Comparative Example 13 | Compound 1001 | — | 112 | 4.5 |
| Comparative Example 14 | Compound 1001 | — | 346 | 4.7 |
| Comparative Example 15 | Compound 1001 | — | 597 | 7.1 |
| Comparative Example 16 | Compound 1001 | — | 824 | 9.5 |
| Comparative Example 17 | Compound 1001 | — | 1046 | 10.6 |

As shown in Table 4, in the secondary batteries including the electrolytic solutions containing the cyclic sulfonic acid ester compound and the acid anhydride (Examples 9 to 15), the volume increase rate decreases more than in the secondary batteries including the electrolytic solutions containing only the cyclic sulfonic acid ester compound (Comparative Examples 11 to 17). As also shown in Comparative Example 3, in the secondary battery including the electrolytic solution containing only the acid anhydride, the volume increase rate increases, and therefore it can be considered that volume increase is suppressed in Examples 9 to 15 by the synergistic effect of the cyclic sulfonic acid ester compound and the acid anhydride.

In addition, as shown in Table 4, in the case where the amount of water in the negative electrode active material layer is in the range of 50 to 1000 ppm, in the secondary batteries including the electrolytic solutions containing the cyclic sulfonic acid ester compound and the acid anhydride (Examples 10 to 14), the volume increase rate decreases more than in the secondary batteries including the electrolytic solutions containing neither the cyclic sulfonic acid ester compound nor the acid anhydride (Comparative Examples 5 to 9). Therefore, the amount of water in the negative electrode active material layer is preferably in the range of 50 to 1000 ppm. In addition, the amount of water in the negative electrode active material layer is more preferably in the range of 50 to 500 ppm. It is considered that when drying is performed until the amount of water in the negative electrode reaches less than 50 ppm, there is a possibility that the CMC, the thickening agent, is modified, and the amount of gas generated increases.

This application claims priority to Japanese Patent Application No. 2013-190748 filed on Sep. 13, 2013, the entire disclosure of which is incorporated herein.

The invention of the present application has been described above with reference to the exemplary embodiments and the Examples, but the invention of the present application is not limited to the above exemplary embodiments and Examples. Various changes that can be understood by those skilled in the art can be made in the configuration and details of the invention of the present application within the scope of the invention of the present application.

INDUSTRIAL APPLICABILITY

The secondary battery according to the exemplary embodiment can be applied, for example, to driving equipment such as electric vehicles, plug-in hybrid vehicles, electric motorcycles, and electrically assisted bicycles, tools such as electric tools, electronic equipment such as portable terminals and notebook computers, and storage batteries such as home electricity storage systems and solar power generation systems.

REFERENCE SIGNS LIST

1 Positive electrode active material layer
2 Negative electrode active material layer
3 Positive electrode current collector
4 Negative electrode current collector
5 Separator
6 Laminate package
7 Laminate package
8 Negative electrode tab
9 Positive electrode tab

The invention claimed is:

1. A secondary battery comprising an electrolytic solution, the electrolytic solution comprising a supporting salt, a nonaqueous solvent that dissolves the supporting salt, a cyclic sulfonic acid ester compound represented by the following formula (11), and an acid anhydride:

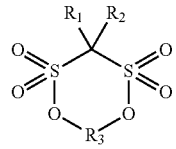
(11)

wherein $R_1$ and $R_2$ each independently represent a hydrogen atom or a fluorine atom; and $R_3$ represents a methylene group, an ethylene group, a fluoromethylene group, or a fluoroethylene group, wherein the acid anhydride is a chain carboxylic anhydride represented by the following formula (I):

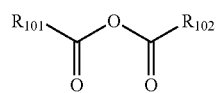
(I)

wherein $R_{101}$ and $R_{102}$ each independently represent an alkyl group having 1 to 5 carbon atoms, wherein a content of the cyclic sulfonic acid ester compound in the electrolytic solution is 0.005 to 10% by mass, wherein a content of the acid anhydride in the electrolytic solution is 0.005 to 10% by mass, and wherein a molar ratio B/A of a concentration B of the acid anhydride in the electrolytic solution to a concentration A of the cyclic sulfonic acid ester compound in the electrolytic solution is in a range of 1/10 to 10/1;

the secondary battery further comprising a negative electrode comprising a negative electrode active material layer, wherein the negative electrode active material layer contains a water-dispersible polymer and a water-compatible thickening agent, an amount of water in the negative electrode active material layer is 50 to 430 ppm, and a volume increase rate when the secondary battery is stored at 45° C. for one week is less than 3.4%.

2. The secondary battery according to claim 1, wherein the cyclic sulfonic acid ester compound is a cyclic disulfonic acid ester compound represented by the following formula (1001) or formula (1002):

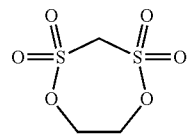
(1001)

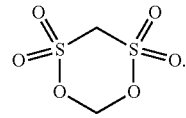
(1002)

3. The secondary battery according to claim 1, wherein in formula (I), $R_{101}$ and $R_{102}$ are each independently a methyl group or an ethyl group.

4. A secondary battery comprising an electrolytic solution, the electrolytic solution comprising a supporting salt, a nonaqueous solvent that dissolves the supporting salt, a cyclic sulfonic acid ester compound represented by the following formula (11), and an acid anhydride represented by the following formulas (2001), (2002), or (2003):

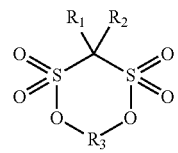
(11)

wherein $R_1$ and $R_2$ each independently represent a hydrogen atom or a fluorine atom; and $R_3$ represents a methylene group, an ethylene group, a fluoromethylene group, or a fluoroethylene group,

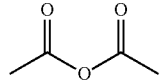
(2001)

-continued

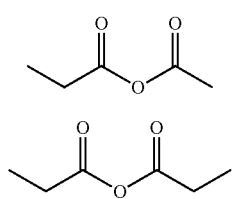
(2002)

(2003)

wherein a content of the cyclic sulfonate acid ester compound in the electrolytic solution is 0.005 to 10% by mass, and wherein a content of the acid anhydride in the electrolytic solution is 0.005 to 10% by mass;

the secondary battery further comprising a negative electrode comprising a negative electrode active material layer, wherein the negative electrode active material layer contains a water-dispersible polymer and a water-compatible thickening agent, an amount of water in the negative electrode active material layer is 50 to 430 ppm, and a volume increase rate when the secondary battery is stored at 45° C. for one week is less than 3.4%.

5. The secondary battery according to claim 4, wherein a molar ratio B/A of a concentration B of the acid anhydride in the electrolytic solution to a concentration A of the cyclic sulfonic acid ester compound in the electrolytic solution is in a range of 1/10 to 10/1.

6. The secondary battery according to claim 4, wherein the cyclic sulfonic acid ester compound is a cyclic disulfonic acid ester compound represented by the following formula (1001) or formula (1002):

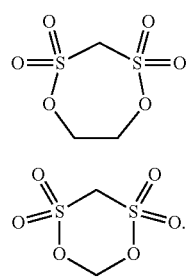

(1001)

(1002)

7. A secondary battery comprising an electrolytic solution, the electrolytic solution comprising a supporting salt, a nonaqueous solvent that dissolves the supporting salt, a cyclic sulfonic acid ester compound represented by the following formula (1001) or formula (1002) and an acid anhydride represented by the following formulas (2001), (2002) or (2003):

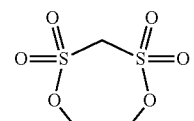
(1001)

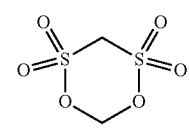
(1002)

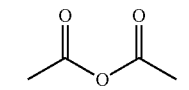
(2001)

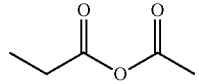
(2002)

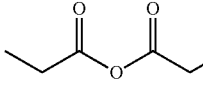
(2003)

wherein a content of the cyclic sulfonic acid ester compound in the electrolytic solution is 0.005 to 10% by mass, wherein a content of the acid anhydride in the electrolytic solution is 0.005 to 10% by mass, and wherein a molar ratio B/A of a concentration B of the acid anhydride in the electrolytic solution to a concentration A of the cyclic sulfonic acid ester compound in the electrolytic solution is in a range of 1/10 to 10/1;

the secondary battery further comprising a negative electrode comprising a negative electrode active material layer, wherein the negative electrode active material layer contains a water-dispersible polymer and a water-compatible thickening agent, an amount of water in the negative electrode active material layer is 50 to 430 ppm, and a volume increase rate when the secondary battery is stored at 45° C. for one week is less than 3.4%.

* * * * *